United States Patent [19]

Brouard et al.

[11] Patent Number: 4,561,900

[45] Date of Patent: Dec. 31, 1985

[54] USE OF NOVEL AMINES AS BASES FOR THE PREPARATION OF EMULSIONS OF HYDROCARBON BINDERS

[75] Inventors: René A. Brouard, L'Isle-Adam; Jean C. Tracez, Arras, both of France

[73] Assignee: Ceca S.A., France

[21] Appl. No.: 400,903

[22] Filed: Jul. 22, 1982

Related U.S. Application Data

[62] Division of Ser. No. 220,242, Dec. 23, 1980, abandoned.

[51] Int. Cl.$^4$ .................. C08L 91/00; C08L 95/00
[52] U.S. Cl. ........................ 106/246; 106/273 N
[58] Field of Search ................ 106/273 N, 246

[56] References Cited

U.S. PATENT DOCUMENTS 2,438,318  5/1948  Johnson ..................... 106/273 N
2,844,599  7/1958  Rendall ..................... 106/273 N
3,259,512  7/1966  Dickson et al. ............. 106/273 N
3,895,172  7/1975  Jones ....................... 106/273 N Primary Examiner—Theodore Morris
Attorney, Agent, or Firm—Poms, Smith, Lande & Rose

[57] ABSTRACT

The present invention relates to novel mixtures based on fatty diamines used for the preparation of surface active agents intended for the preparation of emulsions of hydrocarbon binders, wherein the fatty diamines of said mixtures have the formula:

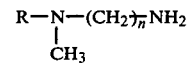

in which
R is a saturated or non-saturated alkyl radical having from 8 to 22 carbon atoms, and $2 \leq n \leq 6$.

5 Claims, No Drawings

USE OF NOVEL AMINES AS BASES FOR THE PREPARATION OF EMULSIONS OF HYDROCARBON BINDERS

This is a division of application Ser. No. 220,242, filed Dec. 23, 1980, now abandoned.

The present invention relates to novel amines which are especially interesting as bases of emulsifiers for hydrocarbon binders.

Hydrocarbon binders (asphalts or tars which may contain various known additives) are used for surfacings, particularly in the form of emulsions. The emulsifying agents which may be used for making these emulsions are for example fatty diamines having from 8 to 22 carbon atoms.

These fatty diamines of industrial nature are, in fact, known to be mixtures containing not only diamines but also by-products such as primary monoamines, triamines. These fatty diamines are products with a relatively high melting point. It has been thought to use them in liquid form either by converting them (Leuckart-Wallasch process which produces numerous novel by products), by adding thereto liquid alkoxylated amines, or by dissolving them in a solvent. Each of these techniques presents certain difficulties in execution.

It has been found that in the industrial mixtures based on fatty diamines as mentioned above, the replacement of the fatty diamines by methylated diamines of formula:

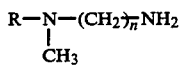

in which:

R is a saturated or non-saturated alkyl radical having from 8 to 22 carbon atoms and $2 \leq n \leq 6$ had, compared with the corresponding non-methylated products, lower melting points and consequently presented interesting properties as base of emulsifying products for hydrocarbon binders.

The products in which n is equal to 3 may be mentioned among the especially interesting diamines.

The melting temperatures of certain diamines according to the invention are given hereinafter:

| R | PRODUCTS | melting temperature °F. | Difference in temperature °F. |
|---|---|---|---|
| 12 | N—dodecyl propylene diamine | +88 | 92 |
|  | N—methyl N—dodecyl propylene diamine | −4 |  |
| 14 | N—tetradecyl propylene diamine | +92 | 74 |
|  | N—tetradecyl N—methyl propylene diamine | +18 |  |
| 18 | N—tallow propylene diamine | +95 | 47 |
|  | N—methyl N—tallow propylene diamine | +48 |  |

These diamines according to the invention may therefore be stored at ambient temperature in the liquid state.

To produce the surface active agents which may be used with the hydrocarbon binders, an emulsifying soap is made by reaction of the diamine (or a mixture of these diamines) with an acid, such as hydrochloric acid, the reaction being carried out in aqueous medium.

With conventional diamines, it is advisable, to carry out this reaction, in melting the diamine previously and dispersing it in hot water before adding the hydrochloric acid.

With the monomethylated amines according to the invention, it will always be possible to disperse the diamine directly in water, at ambient temperature, and to carry out the reaction with hydrochloric acid without heating.

The surface active agents thus produced may be used with hydrocarbon binders, and particularly asphalts, such as those obtained from non-methylated amines. An example of such a use with asphalts is given hereinafter.

EXAMPLE

A cationic emulsion of a road asphalt of normal quality is prepared with the assistance of a colloid mill under conventional temperature conditions (binder at 285° F. aqueous phase at 130° C.) with three formulae of composition (by weight): kg

|  | A | B | C |
|---|---|---|---|
| Asphalt | 600 | 650 | 690 |
| Diamine | 2 | 1.5 | 1.3 |
| Hydrochloric acid |  | for pH = 2 |  |
| Water q.s.p. 1000 |  |  |  |

In the three cases, the N-tallow propylene diamine I and the N-methyl N-tallow propylene diamine (II) product of the invention, have been compared.

The results are given in Table I hereinafter.

The breakdown time is measured by proceeding, at ambient temperature, with the coating of chippings and the formation of a continous film of asphalt is assessed by taking a coated chipping at regular intervals and subjecting it to the jet of water of a washing bottle; the breakdown time is the period after which the film of asphalt is no longer displaced by the water jet.

The adhesiveness is measured by immersing, under determined conditions of duration and temperature, chippings coated with the binder and by observing the variation in percentage of surface coated for the binder.

Emulsions A correspond to coating emulsions. Emulsions B and C correspond to distribution emulsions for making surface dressings.

As shown in the Table, there is no significant difference between the properties of the emulsions made with the N-tallow propylene diamine (I) and N-methyl N-tallow propylene diamine (II).

However, N-methyl N-tallow propylene diamine (II) has a melting point of +48° F. whilst N-tallow propylene diamine (I) has a melting point of +95° F.

TABLE I

| | Emulsion | | | | | | | |
| | A | | | B | | | C | |
| Characteristics | 1 | 2 | 3 | 4 | 5 | 6 | 7 | 8 |

Formula in kg/Tonne of emulsion

TABLE I-continued

| Characteristics | Emulsion A 1 | A 2 | A 3 | B 4 | B 5 | B 6 | C 7 | C 8 |
|---|---|---|---|---|---|---|---|---|
| Asphalt 180/220 | 600 | 600 | 600 | 650 | 650 | 650 | 690 | 690 |
| N—tallow propylene diamine (I) | 2.0 | | | 1.5 | | | 1.3 | |
| N—methyl-N—tallow propylene diamine (II) | | 2.0 | 2.0 | | 1.5 | 1.5 | | 1.3 |
| H Cl (22° Be) | 2.30 | 2.10 | 1.97 | 1.50 | 1.49 | 1.97 | 2.00 | 1.80 |
| Water q.s.p. | 1000 | 1000 | 1000 | 1000 | 1000 | 1000 | 1000 | 1000 |
| pH | | | | | | | | |
| Emulsifier | 1.80 | 1.78 | 1.90 | 2.00 | 1.95 | | | |
| Emulsion | 2.20 | 2.30 | 2.40 | 2.30 | 2.70 | 1.97 | 2.10 | 1.99 |
| Engler viscosity at 20° C. or BRTA | 6° E | 5.7° E | 7.5° E | 20° E | 22.5° E | BRTA 4 mm 11 sec | BRTA 10 mm 59 sec | BRTA 10 mm 66 sec |
| Sieving at 0.63 mm - % of reject | 0.10 | <0.10 | 0.25 | 0.10 | <0.10 | 0.45 | 0.20 | 0.20 |
| Examination after 7 days | | | | | | | | |
| % decantation | 2.8 | 2.4 | 2.0 | 3.00 | 2.4 | 2.0 | <2.0 | <2.0 |
| % of sediment | 7.0 | 9.7 | 8.7 | 13.0 | 12.0 | 4.5 | <2.0 | <2.0 |
| % of breakdown | 0 | 0 | 0 | 0 | 0 | 0 | 0 | 0 |
| Breakdown time in mins | | | | | | | | |
| Siliceous chippings | >20 | >20 | >20 | 18 | 18 | | 20 | 20 |
| Limestone chippings | >20 | 20 | >20 | 10 | 11 | | 18 | 18 |
| Mean diameter | 5.5 | 4.4 | 5.3 | 6.5 | 7.0 | 5.5 | 7.0 | 6.5 |
| Displacement in water % adhesiveness | | | | | | | | |
| Silica          cold | 100 | 100 | 100 | 100 | 100 | 100 | 100 | 100 |
|                 hot | 75 | 75 | 75 | 75 | 75 | 75 | 75 | 75 |
| Limestone       cold | 100 | 100 | 100 | 100 | 100 | 100 | 100 | 100 |
|                 hot | 75 | 75 | 75 | 75 | 75 | 75 | 75 | 75 |
| Breakdown index LCPC (Laboratoire Central des Ponts et Chaussees - Paris France) | 177 | 182 | 186 | 140 | 137 | 167 | 132 | 125 |
| | Coating emulsion Cold coated | | | Distribution emulsion Surface dressings | | | | |

The mixtures based on methylated diamines according to the invention may be used in the crude state or be mixed with liquid alkoxylated amines with a view to reducing their melting point or be dissolved in suitable solvents.

What is claimed is:

1. A method for producing an aqueous emulsion of a hydrocarbon binder which comprises:
   (a) adding a diamine and an acid to an aqueous medium to produce an emulsifying soap of said acid with said diamine in said aqueous medium, said diamine having the formula

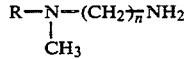

wherein R is saturated or non-saturated alkyl of from 8 to 22 carbon atoms and n is a number between 2 and 6, and
   (b) mixing said emulsifying soap in said aqueous medium with a hydrocarbon binder.

2. A method according to claim 1 wherein R is tallow.

3. A method according to claim 1 wherein the hydrocarbon binder is tar or asphalt.

4. A method according to claim 1 wherein said acid is hydrochloric acid.

5. A method for producing an aqueous emulsion of a hydrocarbon binder which comprises:
   (a) adding a dimine and an acid to an aqueous medium to produce an emulsifying soap of said acid with said diamine in said aqueous medium, said diamine having the formula

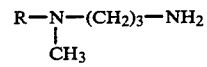

wherein R is a saturated or non-saturated alkyl of from 8 to 22 carbon atoms, and
   (b) mixing said emulsifying soap in said aqueous medium with a hydrocarbon binder.

* * * * *